United States Patent [19]

Nimberger

[11] Patent Number: 5,228,474
[45] Date of Patent: Jul. 20, 1993

[54] FLOW SYSTEM DISCONNECT AND METHOD

[75] Inventor: Spencer Nimberger, Houston, Tex.
[73] Assignee: Precision General, Inc., Houston, Tex.
[21] Appl. No.: 809,577
[22] Filed: Dec. 17, 1991

Related U.S. Application Data

[63] Continuation-in-part of Ser. No. 788,185, Nov. 5, 1991.
[51] Int. Cl.$^5$ ............................................. F16L 37/28
[52] U.S. Cl. .................................... 137/614.04; 285/1
[58] Field of Search ....................... 137/614.04, 614.05, 137/614.06, 616, 616.7, 614, 614.02; 285/1, 307

[56] References Cited

U.S. PATENT DOCUMENTS

| | | |
|---|---|---|
| 3,874,428 | 4/1975 | Golay . |
| 4,269,226 | 5/1981 | Allread ...................... 137/614.05 X |
| 4,354,522 | 10/1982 | Bormioli . |
| 4,723,929 | 2/1988 | Parish . |
| 4,800,913 | 1/1989 | Nitzberg et al. ................... 285/1 X |
| 4,899,792 | 2/1990 | Podgers . |
| 4,905,965 | 3/1990 | Dolev .............................. 285/307 X |
| 4,998,560 | 3/1991 | Le Devehat . |
| 5,050,841 | 9/1991 | Jacobsson ......................... 251/149.9 |

OTHER PUBLICATIONS

Advertisement, P.A.S.S. Pull Away Safety Systems, by Continental NH3 Products.
Advertisement, Rego A2141A Series Pull-Away Valves, by Rego Products.

Primary Examiner—Martin P. Schwadron
Assistant Examiner—Kevin L. Lee
Attorney, Agent, or Firm—Browning, Bushman, Anderson & Brookhart

[57] ABSTRACT

An improved system and method are provided for normally interconnecting a stationary flow line and a flexible flow line, and for automatically separating the flow lines in response to movement of the flexible flow line in excess of a preselected limit. A connection comprises a socket housing sealed to one flow line and a ball housing sealed to another flow line. The housings are separated automatically when a lateral force is transmitted through the flexible flow line to cause excess pivoting movement of one housing related to the other housing. The connection of the present invention is particularly useful for preventing rupture of a flow line during an intermittent pullaway of a portable vessel with respect to a stationary holding tank. In one embodiment, the connection includes at least three ball swivel surfaces for mating engagement with a socket swivel surface. Valve members in each of the housings are held out of engagement with respective seating surfaces when the housings are mated, and automatically close to prevent fluid loss when the housings separate. A seal is provided for maintaining sealed engagement between the ball housing and socket housing when the ball housing normally pivots within a preselected arc limit with respect to the socket housing. The elastomeric seal preferably engages a seating surface forming a portion of an imaginary sphere having a center coincident with a sphere which defines the ball swivel surface and socket swivel surface.

20 Claims, 5 Drawing Sheets

FLOW SYSTEM DISCONNECT AND METHOD

RELATED CASE

This application is a continuation-in-part of U.S. application Ser. No. 07/788,185 filed on Nov. 5, 1991 and entitled EJECTOR PULLAWAY SYSTEM AND APPARATUS.

FIELD OF THE INVENTION

The present invention generally relates to a safety disconnect for a fluid flow system, and more particularly relates to a latch-type connection including two housings which may be repeatedly mated to pass fluid through the system, and which will automatically disconnect to interrupt fluid flow. The connection of the present invention may be used between a stationary anhydrous ammonia or propane storage tank and a transport container, and provides an emergency disconnection of the fluid flow line between these containers.

Background of the Invention

Flow line systems which transport potentially dangerous fluids, such as propane, liquid petroleum gas, or anhydrous ammonia, often include a separable connection for emergency interruption of the flow line extending between a stationary vessel and a portable vessel. Occasionally a transport vehicle pulls away from a stationary filling platform prior to disconnecting one or more flexible fill lines, and the absence of a separable connection may otherwise cause a rupture of the filling station storage tank, which typically has a large capacity. The monetary loss of fluid from such a rupture is nominal compared to the risks commonly associated with the release of toxic vapors, to the environmental consequences of polluting the filling station site, and/or to the fire hazard associated with such a rupture.

A separate connection is often designed into the flow line or fill line to form a "weak link", so that this connection breaks in response to bending forces before the rupture of other portions of the fluid system, such as the holding tank. One commonly used filling system designed to create a weak link connection utilizes a steel bulkhead encased in concrete and enclosing a portion of the flow line extending between the holding tank and a swivel for a flexible line which is passed to the transport vehicle, thereby ensuring that the flow line will break downstream from the concrete bulkhead during an inadvertent vehicle pullaway. This bulkhead system is expensive, particularly if this technique is used to retrofit an existing filling station. Another type of weak link system, referred to as the PASS system, utilizes a shear fitting or coupling mounted within a vertical portion of the flow line. The shear fitting is designed to break in response to lateral forces transmitted through the flexible line during the inadvertent pullaway. The PASS system, which has been applied to anhydrous ammonia filling stations, is also complicated and expensive. The PASS system similarly cannot readily be adapted to retrofit an existing filling station, and has other disadvantages described below.

In each of the above "weak link" systems, a shutoff valve may be installed upstream from the separable connection to retain the fluid in the holding tank if the fill line is broken. The American National Standards and Compressed Gas Association requires all stationary storage installations to have an emergency shutoff valve mounted immediately upstream from the location in the fluid flow system where the flexible hose swivel is mounted, so that a rupture occurring on the flexible hose side of the system can be shut in by this emergency valve. An "excess flow" valve would thus typically be installed in the rigid line downstream from the steel and concrete bulkhead and immediately upstream from the hose swivel. An "excess flow" valve will only terminate flow, however, if there is a rupture in the system which causes the flow rate to exceed the anticipated fill rate, and a leak or rupture may occur downstream from an excess flow valve which does not result in valve closing since the flow rate caused by the rupture does not exceed this preselected value. The PASS system includes an emergency shutoff valve upstream from the shear fitting, with this valve being connected by a tether line extending to the flow line downstream from the shear fitting, so that tension in this line during a pullaway hopefully actuates the shutoff valve to the closed position.

Other types of separable connections include various types of inline valves which separate in response to pullaway forces transmitted through the flexible flow line. One type of inline connection promoted by Rego Products utilizes a form of quick disconnect, with an outer sleeve of the connection being tethered to a stationary point upstream from the valve. When tension is applied to the tether line during the pullaway, the valve is initially pulled away from this fixed point, thereby creating tension on the tether line and subsequently pulling the sleeve axially backward to separate the connection. Another type of inline connection utilizes a shear coupling within a flow line valve, and a shear member is broken by the flow line tension caused during inadvertent pullaway. Each of these latter systems include valves in each coupling housing designed to stop fluid flow in either direction from the disconnected connection. The latter shear coupling design has been applied to a conventional vehicle fueling system, as disclosed in U.S. Pat. No. 4,899,792. U.S. Pat. No. 3,874,428 discloses a gas filling system which includes an excess flow valve and check valves. U.S. Pat. Nos. 4,354,522 and 4,998,560 each disclose complicated emergency shut off systems which are expensive, and are not readily adaptable to common anhydrous ammonia or propane filling stand sites.

A significant problem with the above-described systems in operation is that the separation force exerted on either the "weak link" connection or the inline connection during a pullaway depends upon the pullaway direction. The driver may pull a portable container from a filling station in any direction within an arc of 180 degrees or more, and during this pullaway the flexible flow line can easily engage and become partially wrapped around one or more stationary components, thereby significantly altering the forces required to cause the break or separation in the system. The flexible flow line extending between the swivel and the discharge nozzle may not have a uniform outer diameter, and a coupling, check valve, or various other components secured to or located along the flexible line may also get hung up on a stationary member during pullaway, thereby again significantly affecting the force required to break or separate the system at the intended connection, and possibly causing a rupture at an unintended location within the flow system. It should further be understood that tether lines or cords extending from one component to a safety shutoff valve or disconnect may engage various stationary or portable components, thereby also adversely affecting the reliability of the system. A tether line may become wrapped about or snagged upon a stationary support, the flexible flow line, a broom, or various other objects, so that the reliability of a system utilizing a tether line depends upon system installation procedures and operator discretion.

Another significant problem with prior art flow line disconnect techniques is that the systems do not easily and reliably allow for adjusting the force required to separate or uncouple the connection. The "weak link" systems can only be effectively adjusted by replacing the weak link member, and springs or other biasing components within the inline connections must be replaced to adjust the force required to uncouple the connection. Field adjustment of such system is thus impractical and is limited to specific values determined by on-hand replaceable components. Many of the prior art systems cannot be effectively retrofitted to existing filling stations of the type commonly used for anhydrous ammonia or propane filling sites. Many prior art systems are expensive, and the substantial effort required to repair a disconnected system encourages filling station operators to deactivate the system. Moreover, the reliability of the existing systems is significantly affected by the direction of pullaway, which the filling station operator cannot effectively control. As a consequence, many filling station sites continue to employ the crude control of a steel and cement bulkhead and an excess flow valve, leaving the site operator exposed to significant contamination and safety risks.

The disadvantages of the prior art are overcome by the present invention, and an improved safety connection is hereinafter disclosed for a fluid flow system. The connection of the present invention may be employed in various flow lines extending between a stationary and a portable container, and is particularly well adapted for use at a conventional anhydrous ammonia, liquid petroleum gas, or propane filling site.

SUMMARY OF THE INVENTION

The present invention provides an improved connection designed for terminating flow in a line during an inadvertent pullaway or similar emergency condition. The connection does not require repair or replacement of parts subsequent to separation and before reuse, and may be easily installed on existing systems. Most importantly, the connection of the present invention may be reliably activated irrespective of the pullaway direction, and may be reliably installed in systems which allow driver pullaway in any direction. The connection need not be customized for the installation site, and the desired force required to cause separation may be easily adjusted so that the flow line separates prior to generating forces sufficient to cause a rupture in the line. In a preferred embodiment, the pressure in the lines on both sides of the broken connection is sufficient to close a valve provided in each of the connection housings, thereby trapping fluid both in the line extending back to the storage tank and in the flexible line extending to the discharge head.

In a preferred embodiment, the connection comprises a ball housing and a socket housing each having a central flow path, with each housing including a housing seat and a poppet valve within a housing flow path for sealing engagement with the respective seat. One housing may be secured to a stationary line, and the other housing provided at the upstream end of the flexible line. During mating engagement of the housings, the ends of each of the poppet valves engage to axially space each valve from its respective seat and thereby allow flow through the connection. A seal is provided for normally maintaining a fluid-tight communication between the flow paths in the ball housing and the socket housing. During normal use, the housing remain mated so that the flow path through the ball housing remains substantially vertically aligned with the flow path through the socket housing, with limited angular variation of less than 20 degrees being possible to accommodate movement of the flexible line during normal filling operations. During a pullaway, this 20 degree pivot limit is exceeded before the flexible line becomes taut, and this action occurs irrespective of the pullaway direction. When this pivot limit is exceeded, the ball housing separates from the socket housing, causing separation of the connection and automatic closure of each of the valves within the respective housings. The connection of the present invention serves as a reliable safety disconnect during pullaway and does not interfere with normal handling of the flexible line during filling operations.

In one embodiment, the socket housing includes an annular swivel surface which forms a portion of an imaginary sphere. The ball housing includes three legs having a uniform circumferential spacing between the legs. Each leg has a swivel surface for mating engagement with the socket swivel surface, with each leg swivel surface forming a portion of an imaginary sphere having substantially the same diameter as the imaginary socket sphere. Each of the ball and socket swivel surfaces are radially fixed with respect to a centerline of the respective housing, thereby increasing reliability compared to disconnect systems which rely upon biasing members to maintain the connection mated. During normal use, the ball swivel surfaces and socket swivel surface remain in mating engagement, and the forces acting between the housings do not allow the ball housing to pivot with respect to the socket housing. During a pullaway, the ball housing pivots to cause at least one of the ball housing legs to drop out of engagement with the socket swivel surface, at which time the ball housing is no longer supported and drops out of engagement with the socket housing, causing a disconnection. The fluid pressure within the upstream and downstream flow lines is sufficient to immediately close each poppet valve provided within the separated housings, so that substantially no fluid escapes. If desired, each poppet valve may be spring biased toward its closed position.

The socket housing may be provided with an outer collar which contains the socket swivel surface, and is connected to a socket sleeve which carries the seal. The torqued engagement of this collar alters the force required to pivot the ball housing with respect to the socket housing. The lateral force or movement of the flexible flow line required to initiate pivoting motion of the ball housing with respect to the socking housing, as well as the increased lateral force required to initiate separation of the connection, may thus simultaneously be adjusted by altering the torque applied to the collar. The lower end of the ball housing may be threadably connected to a rigid conduit of a selected length. Since the length of this conduit alters the moment arm acting on the ball and socket connection, the force required to initiate disconnection during a pullaway may be easily controlled in the field by simply altering the length of this conduit.

It is an object of the present invention to provide an improved connection which may be reliably activated to separate the flow line for a fluid flow system of the type including a flexible flow line.

It is a further object of the invention to provide a safety connection for fluid flow line which is relatively inexpensive, which is highly reliable, and which may be added to existing systems at a relatively low cost.

Still another object of the invention is to provide an improved method of separating a flow line connection which may be activated without significant regard to the direction the flexible line is pulled.

It is a feature of the invention that the connection provides both a safety disconnect for a fluid flow line and does not limit or interfere with normal manipulation of the flexible flow line.

It is a further feature of this invention that the connection may be separated and easily connected to bring the system back into service without replacing components.

Still another feature of the invention is that the force which must be exerted on the flexible flow line to cause the connection separation may be easily adjusted.

It is an advantage of the connection according to the present invention that the connection may be quickly and reliably installed without significant modifications to an existing system.

These and further objects, features and advantages of the present invention will become apparent from the following detailed description, wherein reference is made to the figures in the accompanying drawings.

DETAILED DESCRIPTION OF PREFERRED EMBODIMENTS

The present invention provides an improved flow line system which includes a separable connection to normally transmit fluid between a fixed or stationary flow line extending from a storage container and a flexible flow line. The flexible line typically may extend to a flow discharge nozzle, and is manipulated to pass pressurized fluid to each of various portable containers. The connection is preferably mounted about a substantially vertical axis, and a horizontal force exerted on the flexible line will cause the connection and thus the flow lines to separate. In a typical application, the connection provides an emergency separation if the portable container is inadvertently moved before the discharge nozzle at a terminal end of the flexible line is disconnected from the portable container. During this inadvertent pullaway, the movement of the flexible line will effectively separate the connection, thus minimizing or eliminating a significant contamination and safety risk.

Figure 1:
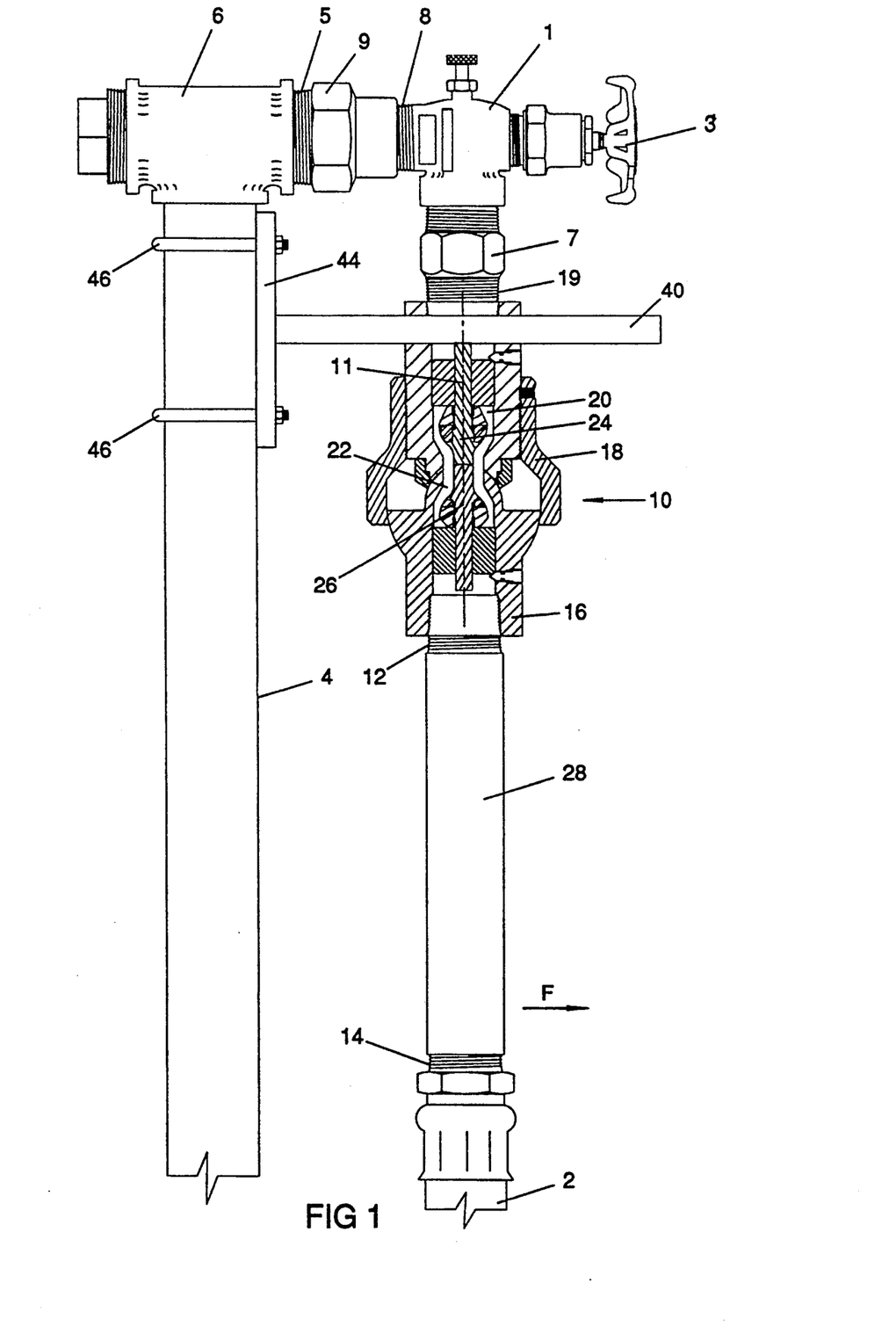
FIG. 1 is an elevational view, partially in cross-section, and a separable flow line system in accordance with the present invention.

FIG. 1 depicts an exemplary fluid system according to the present invention, including a connection 10 mounted between valve 1 and flexible fill hose 2. Valve 1 is connected to coupling 9 by threads 8, and coupling 9 in turn in connected to tee 6 by threads 5. Stationary conduit 4 transmits fluid from a suitable storage container (not shown) through line 4 and valve 1, and then through fitting 7, connection 10, and flexible line 2 to a suitable portable vessel (not shown). It should be understood that the stationary components of the flow system as shown in FIG. 1 are arranged such that the connection 10 is mounted about a generally vertical central axis 11. Since the ground surface can be presumed to be substantially horizontal, pullaway of the portable vehicle in any direction will cause a lateral or horizontal force to be exerted on the connection, which will automatically cause separation of the flow system, as explained hereafter.

Major components of the connection 10 include a ball housing 16 which mates with and is normally supported by socket housing 18. A flow path 20 in the socket housing is normally in fluid communication with a flow passage 22 in the ball housing to transmit fluid through the connection. The socket housing and ball housing may each be provided with poppet valve members 24 and 26, respectively, which close when the housings 16 and 18 separate to seal fluid flow from the passageways 20 and 22. This closing action effectively prevents fluid loss from the storage container through the separated connection, and also prevents fluid within the flexible hose 2 from escaping through the ball housing of the separated connection.

A standard fitting 7 may be used to threadably interconnect the valve 1 to the socket housing. Rigid conduit 28 is connected by threads 12 to a lower end of the ball housing, and the lower end of conduit 28 is connected by threads 14 to the flexible fill hose 2. During inadvertent pullaway, a lateral or horizontal force F as shown in FIG. 1 will be exerted on the conduit 28 due to increasing movement of the flexible hose. This movement will be transmitted to connection 10, and the pivoting force exerted on the connection during pullaway will be directly related to the length of the conduit 28. As explained subsequently, the force which must be applied to the connection 10 during a pullaway to separate the connection may be easily adjusted by increasing or decreasing the length of rigid conduit 28.

Valve 1 may be of the type which includes a conventional handle 3 for manually closing the valve. It should also be understood that the valve 1 may be of the conventional "excess flow" type, wherein the valve automatically closes if the flow through the valve exceeds a predetermined amount. As noted earlier, excess flow valves are commonly used in filling systems to comply with safety standards, but do not necessarily achieve their desired shut-off purpose since the valve will only automatically close if flow exceeds this predetermined amount. It is a feature of the present invention that the operation of the connection 10 during inadvertent pullaway is not dependent upon the pullaway direction, and thus it should be understood that the force F applied to the lower end of rigid conduit 28 may be within any direction with a plane generally perpendicular to the axis 11. To prevent any possibility that a pullaway force will rotate the valve 1 with respect to the tee 6, a fixed member, such as a bar 40, may be provided on each side of the connection 10. Each horizontal bar 40 is cantilevered from plate 44, which in turn is fixably mounted to pipe 4 by a pair of conventional U-bolts 46.

It is a feature of the present invention that a flow system as shown in FIG. 1 may be easily obtained by retrofitting an existing system. Valve 1 may be closed, and the threaded connection between the valve and flexible hose 2 may be broken. The bracket and pair of spaced members 40 may then be secured to the pipe 4, and the connection 10 installed on the fitting 7. The conduit 28 of a desired axial length may then be threaded to the lower end of the connection 10, and the flexible line 2 then threaded to the conduit 28 as shown. The installation of the connection 10 according to the present invention is thus simple, and does not require special equipment. Installation or retrofitting techniques, such as welding or cutting, which have a high degree of risk when used about filling systems transmitting certain fluids are not required to retrofit an existing system to obtain the system as shown in FIG. 1.

Figure 2:
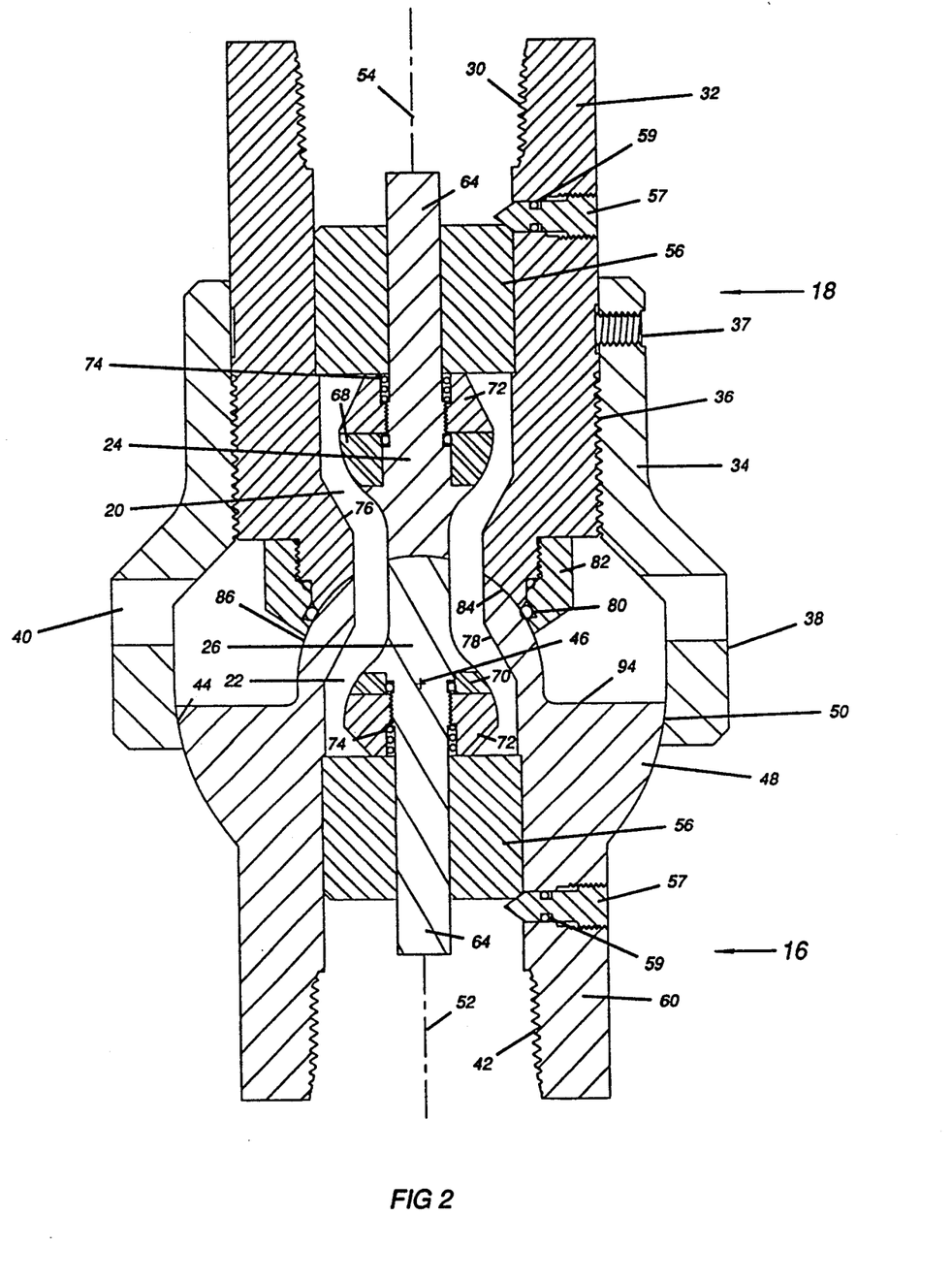
FIG. 2 is a detailed cross-sectional view of the separable connection generally shown in FIG. 1 in its mated condition.

FIG. 2 illustrates the connection 10 in greater detail. The socket housing 18 comprises a sleeve 32 and a collar 34 threadably connected thereto at 36. Internal threads 30 on the sleeve are provided for sealing engagement with conventional fitting 7. The outer surface 38 of the collar may have a hexagonal configuration to facilitate torqued rotation of the collar relative to the sleeve. Alternatively, an aperture 39 may be provided in the collar for receiving a rod-like tool to achieve the desired torqued rotation of the collar, as described subsequently. The ball housing 16 includes lower threads 42 for sealing engagement with the rigid conduit 28.

The collar 34 includes one or more annular swivel surfaces 44 radially fixed thereon, with the surface or surfaces 44 each being defined by or lying within a portion of the surface of an imaginary sphere having a centerpoint 46 spaced between the swivel surfaces and the upper end of the socket housing. The ball housing includes three radially protruding legs 48, and each leg includes a swivel surface 50 radially fixed thereon for mating engagement with the surface 44. Each surface 50 is also defined by or lies within the surface of an imaginary ball sphere which has a substantially equal diameter to the socket imaginary sphere. The center of the ball sphere is substantially coincident with the centerpoint 46, so that the ball housing may pivot with respect to the socket housing within any direction. The pivoting of the ball housing 36 will thus necessarily be within an arc having its center at 46, and during this pivoting movement the surfaces 44 and 50 remain in planar engagement.

Figure 3:
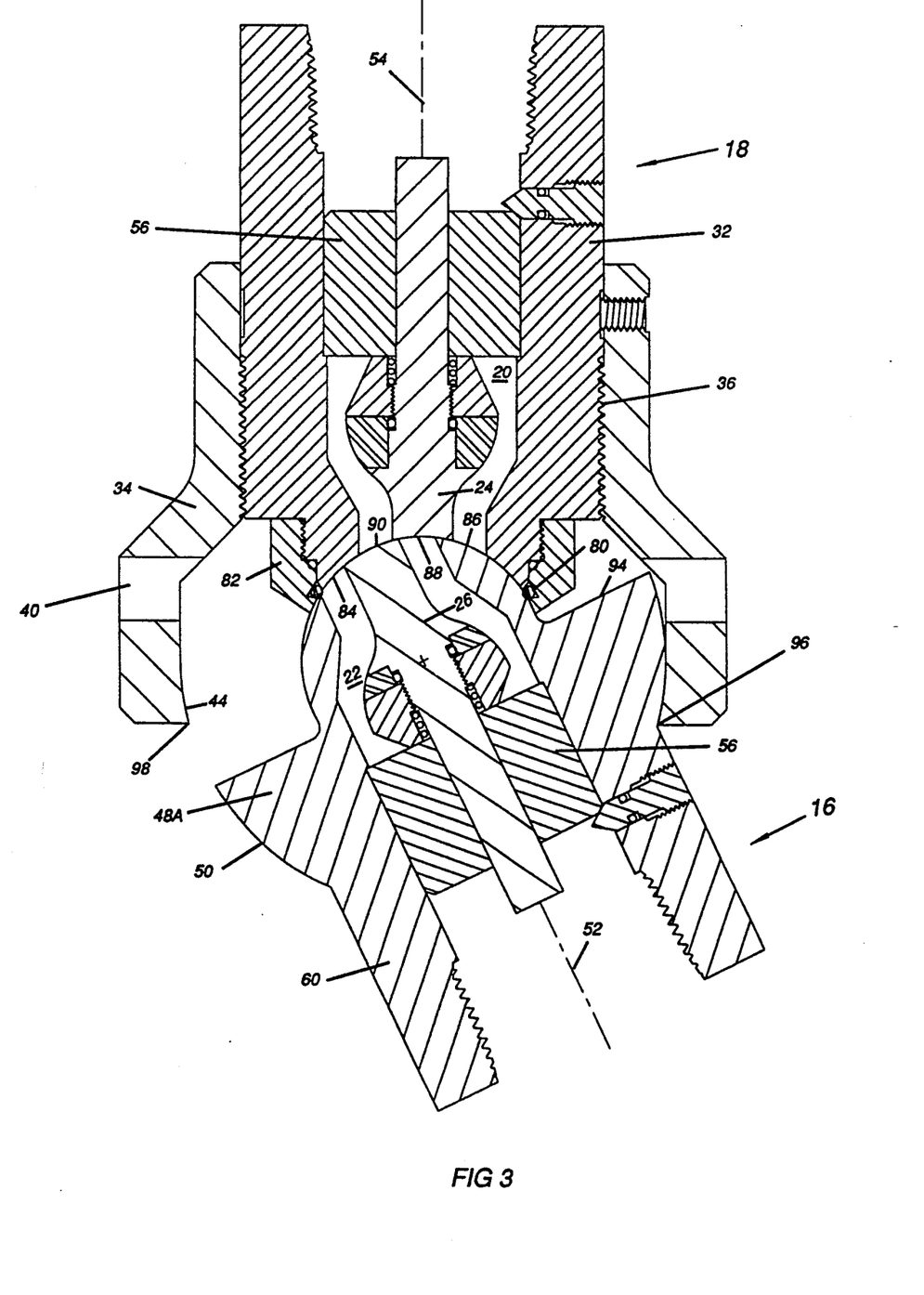
FIG. 3 is a detailed cross-sectional view of the connection shown in FIG. 2 with the ball housing pivoted to disengage from the socket housing.
Figure 4:
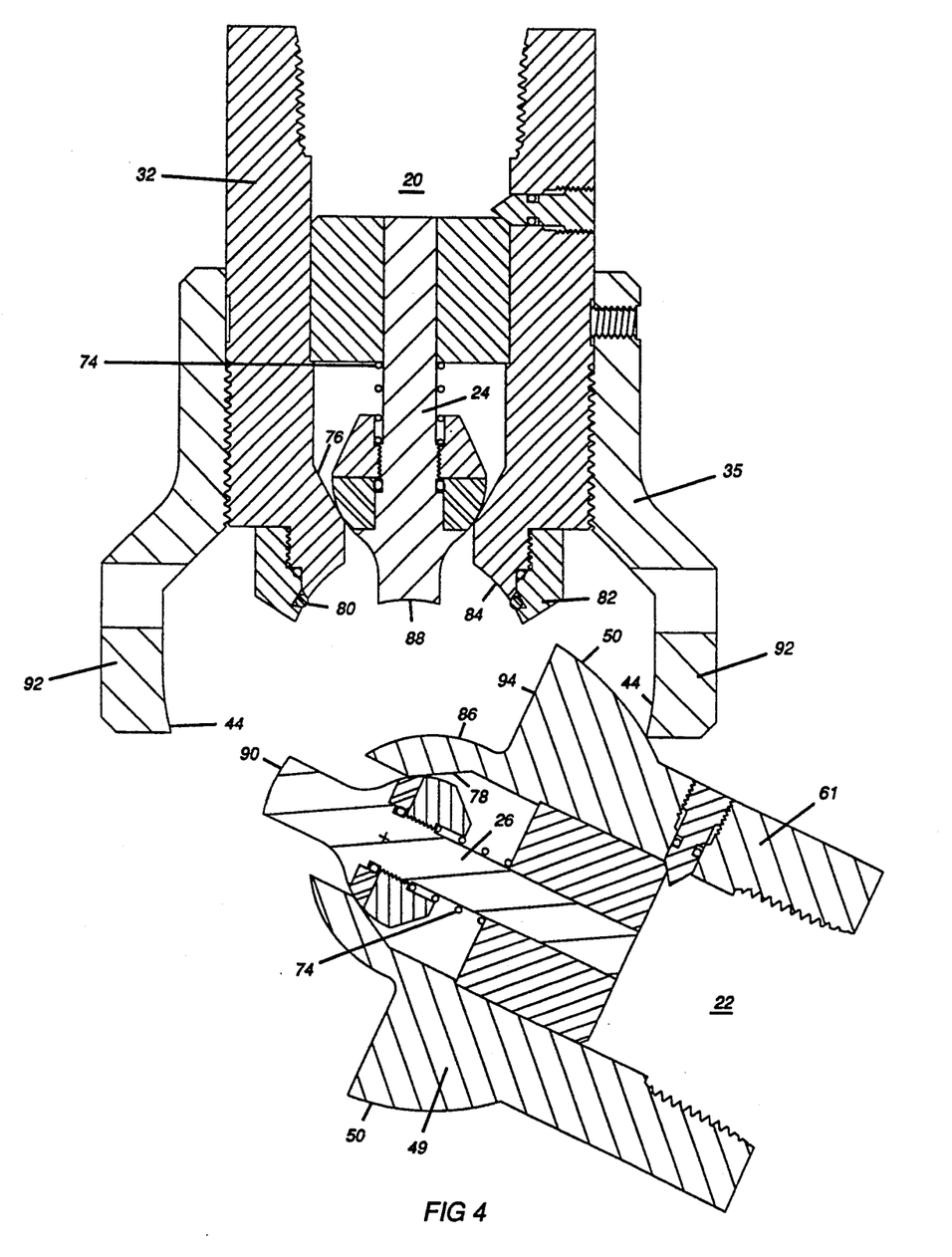
FIG. 4 is a cross-sectional view of another embodiment of the connection according to the invention, illustrating automatic closure of the poppet valve members following separation of the ball housing from the socket housing.
Figure 5:
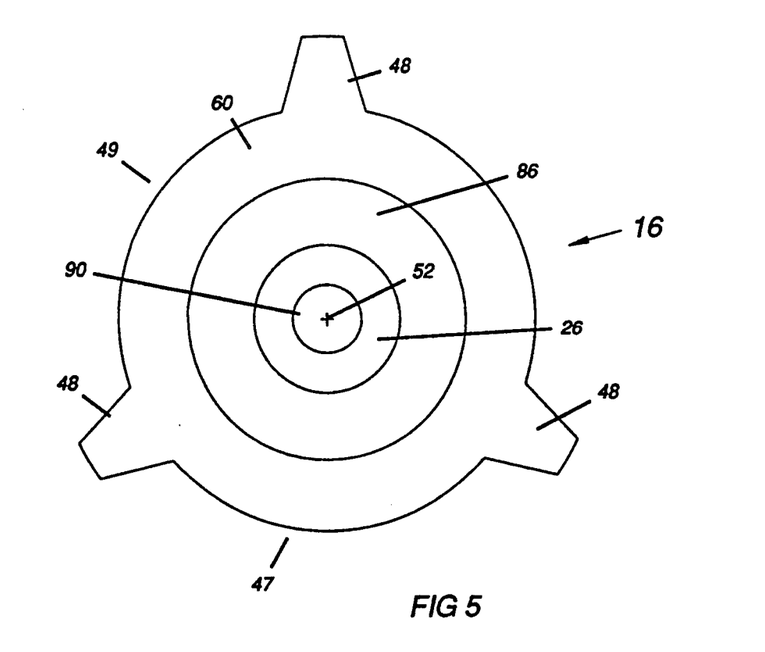
FIG. 5 is a top view of the ball housing shown in FIG. 2, illustrating the circumferential position of the leg members.

FIG. 5 depicts a top view of the ball housing 16 as shown in FIG. 2, and specifically illustrates the uniform circumferential positioning of each of the three legs 48. The recessions 49 between the legs create arcuate disengaging gaps each positioned between a pair of legs. The recessions 49 allow the ball housing to separate from the socket housing. The legs 49 are uniformly spaced at 120° intervals about the periphery of a spherical segment within a plane perpendicular to the axis 52 and passing through the the surfaces 50. Each leg preferably has a uniform circumferential width, and accordingly the circumferential length of each recession 49 is also uniform. It should thus be understood that the cross-section view of the connection 10 as shown in FIGS. 1-4 is taken through a plane passing through the central axis 52 of the housing 16 and including the 120° angle to extend through each of two legs 48 of the ball housing.

The ball housing 16 may thus pivot about centerpoint 46 with respect to the socket housing 18, and this pivotable movement will cause the swivel surface 50 of at least one of the legs 48 to move toward the sleeve 32, while the surface 50 of another of the legs will move down the surface 44 and away from the sleeve 32. The surfaces 44 and 50 nevertheless remain in mating and planar engagement, so that spherical portion surfaces 44 and 50 keep the centerpoint of the ball sphere coincident with the centerpoint of the socket sphere during this pivoting movement, regardless of the pivoting direction.

When a lateral force F in any direction within a horizontal plane acting on the rigid conduit 28 causes the ball housing 16 to pivot beyond a preselected amount, e.g., 20 degrees, with respect to the centerline of socket housing 18 (which preferably is coaxial with vertical axis 11), one or more of the legs 48 come out of engagement with the pivot surface 44 on the socket housing. During this pivoting motion, the ledge 94 between surface 86 and the radially outward end of each leg provides a cavity to receive the end of surface 84, and disengagement of the ball housing from the socket housing occurs before surface 84 engages ledge 94. FIG. 3 depicts the connection 10 wherein the centerline 52 of the ball housing has rotated more than 20 degrees with respect to the centerline 54 of the socket housing, and accordingly the leg 48A has completely disengaged the surface 44 on the socket housing. Once this condition occurs, the ball housing 16 is free to completely separate from the socket housing due to gravity and/or continued pull on the flexible hose, and further separation of a connection is shown in FIG. 4. For the embodiment discussed above, surfaces 50 on the ball housing 16 serve as control surfaces to selectively disengage the ball housing from the socket housing.

Figure 6:
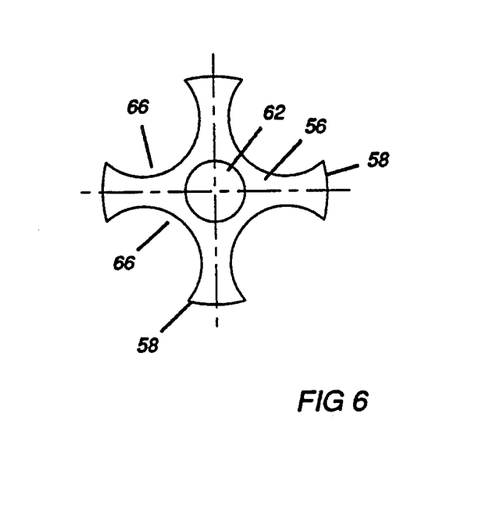
FIG. 6 is a top view of the valve support generally shown in FIG. 2.

FIG. 4 depicts the poppet valve member 24 and 26 sealing their respective flow passages 20 and 22, respectively, within the socket housing and the ball housing. Each valve member is movable along the respective axis 54, 52 within the respective housings 18, 16 (see FIG. 2), with axial movement being guided by valve support member 56. Support member 56 is shown in FIG. 6, and includes a plurality of outer surfaces 58 for engagement with the respective sleeve 32 and the ball housing member 60, a cylindrical passageway 62 for receiving the rod-like stem portion 64 of the respective valve member, and a plurality of recessed cavities 66 for transmitting fluid through the connection. Each member 56 may be axially fixed within its respective housing by a set screw 57 sealed to the housing by O-ring 59. Valve members 24 and 26 have ring-shaped sealing member 68, 70 sealingly mounted thereon and secured in place by a ring member 72 threaded to the stem portion. Each valve member is biased by a coil spring 74 for sealing engagement with a respective conical seating surface 76, 78 within the housings 18, 16, respectively.

An elastomeric seal 80, such as an O-ring, is mounted on the socket housing 18 and held in place by retainer 82 threaded to socket sleeve 32. The socket sleeve 32 and the retainer 82 define a common curvalinear guiding surface 84 discussed subsequently, and the ball housing 16 includes a mating curvalinear guiding surface 86, which also acts as a seating surface for sliding engagement with the O-ring. When the connection 10 is in the position as shown in FIG. 2, fluid may pass from one flow line through the passageways 20, 22 in the connection and to the other flow line for filling the portable vessel. In order to maintain a fluid-tight seal between the socket housing and the ball housing during pivotable rotation of the ball housing, the surface 86 on the ball housing serves as a connection seating surface, and is an annular surface portion of an imaginary connection seating sphere having a diameter less than the diameter of the ball sphere and socket sphere discussed earlier, and with this connection seating sphere having its center also substantially coincident with point 46. The seal 80 mounted on the socket housing will thus maintain reliable sealing engagement with the surface 86 regardless of the direction of the pivotable rotation of the ball housing with respect to the socket housing, since the centerpoints for surfaces 86, 84, 44 and 50 are coincident or substantially coincident.

During movement of the flexible flow line, a lateral force will likely be exerted upon the rigid conduit 28 to cause pivoting movement of the ball housing 16 with respect to the socket housing 18. To control this pivoting movement, the collar 38 may be torqued with respect to sleeve 32 so that a desired axial mating force is obtained between the surfaces 84 and 86, which in turn must be opposed by an axial force between the surfaces 44 and 50. By torquing the collar 38 to the desired extent, the static frictional forces between the above-described surfaces may be adjusted so that the ball housing 16 pivots in response to a lateral force F to allow the flexible hose to be manually manipulated to its desired location, although this force F is not sufficient to disengage the ball housing 16 from the socket housing 18. Once the collar is torqued to its desired extent, it may be rotationally secured to the socket sleeve by tightening a suitable lock screw (not shown) threaded in port 37 of the collar.

Referring now to FIG. 3, it may be seen that the poppet valve member 24 is provided with a terminal end surface 88 which has a slightly concave configuration, while the terminal end surface 90 of the mating poppet valve member 26 has a slightly convex configuration. It is an important feature of the present invention that the terminal end surfaces 88, 90 of the poppet valve members be configured so that these surfaces will readily slide over one another during pivoting movement of the ball housing with respect to the socket housing, and most importantly that these surfaces cannot get "hung up" on each other to prevent the ball housing from continuing to freely pivot with respect to the socket housing. To achieve this objective, it is also a feature of the invention that the end surface 88 be configured to matingly engage and slide over the connection seating surface 86 on the ball housing prior to disengaging from the terminal surface 90. As shown in FIG. 3, surface 88 remains in engagement with surface 90 during pivotable motion of the ball housing with respect to the socket housing, and surface 88 further engages surface 86 before disengaging from surface 90. FIG. 3 depicts a situation where the ball housing has rotated more than the preselected arcuate amount, so that the ball housing is disengaging from the socket housing. FIG. 3 thus depicts that the terminal end surface 88 will slidably engage the surface 86 before disengaging end surface 90, and this engagement with surface 86 will occur without having the poppet valve member 24 move axially from its position within housing 18 when its surface 88 was only in engagement with terminal end surface 90 of the valve member 26. Similarly, the annular surface portion 84 on the end of sleeve 32 adjacent the seal 80 is configured to slidably engage the terminal end 90 of the poppet valve member 26 before disengaging the surface 88. Surface 84 is thus also a surface portion of an imaginary sphere having a diameter substantially equal to the connection seating sphere and having its center coincident with point 46.

In order to prevent the valve members 24 and 26 from possibly getting hung up during pivoting of the ball housing with respect to the socket housing, it is a feature of the invention that each of the valves 24, 26 not be permitted to move axially within its respective housing 18, 16 between the time that the housings are mated until the time that the pivoting housing disengages from the fixed housing. As shown in FIGS. 2 and 3, axial movement of each valve member is prevented by a respective support 56, which effectively serves as a stop to prevent axial movement of each valve member away from its respective seating surface. During pivoting movement of one housing relative to the other housing, neither valve can move axially within its respective housing, and the centerpoint for each of the surfaces 88 and 90 remains at point 46 until the surfaces 84 and 86 separate, which is only possible once one or more of the control surfaces completely disengages from the mating swivel surface.

The above feature of the invention thus serves the primary purpose of ensuring that the terminal end surfaces 88 and 90 will not get hung up during pivotable movement of the ball housing with respect to the socket housing, and also provides substantially mating surfaces which enable the seal 80 to be positioned on the surface 84 and maintain reliable sealing engagement with the connection seating surface 86 on the ball housing. FIG. 3 further depicts that the components of the connection are sized and arranged such that the annular seal 80 will be in continual engagement with the seating surface 86 during pivotable movement of the ball housing with respect to the socket housing within the preselected arc limit which does not result in connection disengagement. No portion of the seal 80 will thus ride up the surface 86 sufficient to disengage the mating surface 86 and enter the passageway 22 through the ball housing until after one or more of the legs 48 disengage from the annular surface 44, thus allowing the ball housing to separate from the socket housing.

Once the ball housing and socket housing separate, the end surfaces 88 and 90 of the respective poppet valve members 24, 26 will thus disengage both each other and the surfaces 86, 84. As shown in FIG. 4, the poppet valve members 24, 26 are then released so that they may move axially into sealing engagement with the respective conical seating surface 76, 78. It should be understood that the fluid pressure within the passageways 20, 22 will normally be sufficient to immediately force the valve members into sealing engagement with their respective housings, as shown in FIG. 4, although coil springs 74 may optionally be provided for further biasing the valve members to the sealing position. Tests show that when the connection 10 separates, pressurized fluid is sealed in the stationary line by valve 24 and seat 76, and any pressure within the flexible line is also sealed by valve 26 and seat 78.

Various modifications may be made to the connection described above without departing from the invention, and FIG. 4 depicts one modification. Only the ball member and collar are changed compared to previously-described components, and accordingly like numerals are used for similar components. The ball member 61 in FIG. 4 includes a continuous outer ring providing a continuous annular surface 50, and the lower end of the collar 35 includes three circumferentially spaced legs 92 each having a pivoting surface 44 thereon. The cross-section of a collar as depicted in FIG. 4 thus passes through two of the legs 92, just as the cross-section of the ball as shown in FIGS. 2 and 3 passed through two legs 48 on the ball member. Legs 92 on the collar are positioned uniformly in the same manner as the legs 48 on the ball housing, so that three circumferentially spaced legs are provided each having arcuate recessions or gaps therebetween which allow the connection to disengage. The ball member 61 has a circumferential shoulder ledge 94 interconnecting the radially inner surface 86 with the radially outer surface 50 to define a cavity to receive the ring 92 during pivoting motion. Rather than have three circumferentially spaced legs on the ball member and a collar forming an annular continuous surface 44 as earlier described, the ball member 61 has a ring 49 defining a continuous annular pivoting surface 50, while three spaced legs 92 on the lower end of the collar now form the three circumferentially spaced pivoting surfaces 44. In the embodiment as depicted in FIG. 4, surface 44 on two of the three legs 92 has disengaged from the annular surface 50 on the ball member, and this disengagement separates the connection in the same manner as previously described.

It should thus be understood that three equally spaced legs are preferably provided on the ball housing or on the socket housing for forming the plurality of circumferentially spaced pivoting surfaces which serve as control surfaces for normally engaging the annular mating surface or surfaces on the other housing. One or more of the control surfaces disengage from the mating surface on the other housing once the pivoting of the housing exceeds a predetermined arc limit, thus causing all the control surfaces and the mating surfaces to disengage and separating the connection. It should be understood that when three such control surfaces are provided uniformly spaced about the circumference of the housing, a pullaway in any direction will result in separation of the connection. A pullaway in a direction directly opposite one of three legs will result in separation at the lowest possible pivoting angle, e.g., 10 degrees, while a pullaway in the direction of one of the legs will result in separation at the largest pivoting angle, e.g., 20 degrees. In the latter case, the housing must pivot to a greater extent prior to disengagement due to the geometry of these components, and two legs will simultaneously disengage the mating surface. Pullaway will normally be in a direction between these two extremes, since the ball housing is free to rotate with respect to the socket housing, and disengagement will thus be between the 10 degree and 20 degree extremes.

It should also be noted that it is particularly advantageous that the connection have exactly three such uniformly spaced legs. If the legs are not uniformly positioned about the circumference of the respective housing, the connection may function, although the exemplary pivoting angle range of 10 degrees to 20 degrees will then disadvantageously broaden. Also, three such legs uniformly positioned are highly preferable, although any odd numbered plurality of uniformly positioned spaced legs are at least theoretically possible to achieve disconnection regardless of the pullaway direction. If the legs are uniformly spaced, the spacing between opposing even numbered legs will exceed the minimum diameter of the mating swivel surface, and the housings would thus not separate if the pullaway direction was normal to any two radially opposing legs. Two of the four legs would have to disengage the mating swivel surface in order for the embodiment with four equally spaced legs to separate, and this separation could occur in many but not all pullaway directions. If five such equally spaced legs are provided, the four control surfaces which remain in engagement when one such surface disengages the annular mating surface will still prevent the housings from separating. Either two or three control surfaces of the five leg embodiment will thus have to disengage the mating swivel surface before the housings can disengage. While an increase in lateral force during a pullaway will result in further pivoting motion and will eventually rotate these two or three control surfaces out of engagement, the required pivoting angle to cause separation for this five leg embodiment would likely increase compared to the three leg embodiment. An increase in the pivoting angle required to cause disengagement disadvantageously affects the overall size and cost of the connection. This five leg embodiment also has a disadvantage of increased manufacturing costs, with no significant advantage over the three leg embodiments previously described.

The housing which does not contain the three or more control surfaces may have a single annular swivel surface, as described above, but also could comprise more than one swivel surface. In one embodiment, a plurality of ring-shaped mating surfaces each spaced axially by a slight undercutting gap could be provided, and the control surfaces would mate with the one or more axially spaced swivel surfaces. When one control surface disengaged from the swivel surface at the extreme end of its respective housing, connection disengagement would occur. Alternatively, the swivel surfaces may be substantially continuous, but slight gaps could be provided along the circumference of each substantially continuous surface to effectively form multiple surfaces. These gaps should be narrow, however, to prevent any of the control surfaces from disengaging the mating swivel surfaces prior to the intended disengagement in response to tilting of one housing with respect to the other housing. Any such gaps would thus normally have a circumferential width less than the circumferential width of the control surfaces.

The method of the present invention will now be described, with particular reference to FIG. 1. An improved method of forming a separable connection between rigid flow line 4 and a flexible flow line 2 may first involve the closure of the valve 1 and the removal of flexible line 2 from the fitting 7, as described above. The sleeve of the socket housing may be threaded to fitting 7, and the rigid members 40 fixed with respect to the fixed line 4 and positioned on each side of the socket housing. With the collar 34 threaded downward and away from the valve 1, the ball housing 16 may be positioned within and supported by the collar. At this stage, the fixed conduit 28 may already have been threaded to the ball housing, and the flexible line 2 optionally secured to the lower end of conduit 28. An upper terminal end of the socket housing will thus be sealingly mounted to the rigid flow line, while the lower terminal end of the ball housing may be sealingly connected to the flexible flow line. At this stage, the collar may be threaded upward with respect to the socket sleeve, causing the surface 86 to engage the seal 80, and the housing terminal ends of the valves 24 and 26 to disengage their respective seating surfaces. The collar 34 may then be torqued to a desired limit with respect to the sleeve to adjust the mating force between the housings and thereby selectively control the pivoting movement of the ball housing with respect to the socket housing in response to movement of the flow line. At this stage, sealed engagement will be maintained between the socket housing and the ball housing while the ball housing pivots within a selected arc limit with respect to the vertical axis. The valve 1 may thus be opened and fluid transmitted through the connection to fill the portable vessel in a conventional manner. During normal filling operations, the manipulation of the flexible hose 2 may cause a sufficient lateral force to be exerted on the conduit 28 that the ball housing pivots within an arc less than the preselected limit, and the housings remain mated. During an inadvertent pullaway, this lateral force will be significantly increased, and will cause the ball housing to pivot beyond the selected arc limit, thereby automatically releasing the ball housing from the socket housing in a manner described above.

If the operator discovers after a period of time that the connection is separating during normal manipulation of the flexible hose, the system may be easily modified by inserting a conduit 28 having a shorter length. Shortening the length of conduit 28 will thus require a greater lateral force to be transmitted through the flexible line to cause the ball housing to pivot with respect to the socket housing. Conversely, the connection may be easily adjusted to become more sensitive and separate with less lateral force by increasing the length of the conduit 28. It should be understood that the conduit 28 thus provides a convenient means for adjusting the sensitivity of the connection. Alternatively, flexible hose 2 may be directly threaded to the ball member, and a rigid elongate member which is not part of the flow stream may be connected at one end to the ball housing, and secured at its opposing end to the flexible flow line. This rigid pivot arm would thus act as a lever in the same manner as conduit 28, and the length of this rigid member could be selected to effectively control pivoting movement of the ball housing with respect to the socket housing.

Various modifications may also be made with respect to the seal which normally maintains sealing engagement between the socket housing and the ball housing. The substantial advantages of the embodiments described above which utilize a stationary elastomeric seal on one of the housings and a connection seating surface on the other of the housings are simplicity, high reliability, and low cost. The elastomeric seal may, of course, be provided on the ball housing and the connection seating surface provided at the end of the sleeve member of the socket housing. As an alternative to the above sealing technique, a flexible sealing member, such as a bellows seal, could be provided between the ball housing and the socket housing to maintain the desired sealing engagement for transmitting fluid between the first and second flow paths when the ball housing pivoted with respect to the socket housing. Such a flexible seal could be fixed at one end, for example, to the sleeve member of the socket housing, then detachably secured at its opposing end to the ball housing. During separation of the connection, the flexible seal would thus detach and separate from the ball housing as the ball housing separated from the socket housing.

If the connection sealing technique does not require a connection seating surface to be part of a sphere, the swivel surfaces on the ball housing and socket housing also need not each be defined by a sphere. By having the surfaces 44 and 50 formed as described above, the mated surfaces will remain in planar engagement during pivoting motion of one housing relative to the other housing, which reduces wear and minimizes the likelihood of the housings getting hung up compared to the surfaces 44 and 50 having only have line contact engagement during this pivoting motion. Since planar engagement of the surfaces 44 and 50 is desired, the ball and socket spherical surface portions as previously described are preferred, and this arrangement enables the centerpoint for the connection seating surface to be coincident with point 46 to substantially reduce the expense and improve the reliability of the connection seal. The annular seal member 80 may thus be mounted on the other housing and reliably maintain sealing engagement between the housings during pivoting movement.

The arrangement of the sleeve and the collar to form the socket housing is a preferred technique for allowing the housings to be mated, and for exerting a desired axial mating force between the housings to control the force required to pivot one housing relative to the other. This arrangement also allows the collar to exert an axial force on the ball housing to control the force which the ball housing then exerts upon the seal 80. Alternative techniques could be used, however, to achieve these objectives. As one example, the socket sleeve and collar could be formed as a unitary member, and the three legs on the ball housing could each be axially movable within a respective channel provided in a ball sleeve. Once the ball and socket housings were mated so that the surfaces 50 and 44 were in engagement, the legs could be uniformly moved axially with respect to a ball sleeve and away from the socket housing by a ring threaded to the ball sleeve, until the desired mating force between the ball and socket housings was obtained.

If the connection of the present invention is used for transmitting toxic fluids, valve members are preferably provided in each of the ball housing and socket housing, as depicted, for sealing engagement with the respective conical seating surfaces when the housings separate. As shown in FIG. 2, the annular seal 68 may be configured differently than the annular seal 70, since the connection 10 is arranged so that pressurized fluid from the storage tank is sealed when the valve 24 engages the seat 76, while the fluid in the flexible line normally is not under pump pressure once the housings separate. It should be understood that the connection has utility, however, if only one valve member is provided, which normally would be in the upstream housing. In this case, a stationary probe could be provided in the downstream housing for engaging the terminal end of the valve member when the housings were mated. In other applications, the connection according to the present invention may not have a valve member in either housing, in which case the connection is nevertheless serving both as a swivel and a portable connection to prevent rupture of the flexible hose during a pullaway. This latter connection may, for example, be used in applications where the transmitted fluid is not toxic, and/or where there is a very high reliability that a valve upstream from the connection will automatically close before or when the housings of the connection separate.

It should be understood that the connection is preferably mounted so that it has a substantially vertical axis during normal operation, thereby ensuring that the lateral forces created during a pullaway in any direction will cause separation of the housing, while gravity assists in separating the housings. One advantage of having the socket housing mounted above the ball housing is that the ball housing is generally the lighter member, and thus it is easier for an operator to raise the ball housing to re-engage the socket housing than it would be to raise the socket housing to re-engage a ball housing. Also, it is advantageous to have a collar threaded to a sleeve to form the socket housing as described above, and the ball housing depicted may be better able to withstand anticipated jarring when it falls after separation than would a socket housing which included the threaded sleeve and collar arrangement.

As shown in FIG. 3, the ball housing includes an interference surface 96 between the surface 50 on each leg and the cylindrical outer surface of member 60. This interference surface 96 is positioned for engaging the end surface 98 of mating surface 44 during pivoting motion. After the surfaces 96 and 98 engage, as shown in FIG. 3, the ball will tend to pivot about this engagement point, thereby disengaging the surfaces 88 and 90. While gravity may also contribute to the disengagement of the housings, as shown in FIG. 4, the engagement of surfaces 96 and 98 assists disengagement, and may alone cause separation of the housings when the fixed housing is the lower housing. In this latter case, the upper housing connected to the flexible hose is pulled out of engagement with the lower housing when the flexible line is pulled to cause pivoting motion, and disengagement of the housings occurs as a result of the engagement of surfaces 96 and 98.

The connection housing may be mounted to the fixed or stationary line and positioned above the housing mounted to the flexible line, so that gravity assists in separating the housings once the one or more control surfaces disengage from the mating swivel surface. As noted above, the lower housing could be fixed to the stationary flow line, and the upper housing interconnected with the flexible flow line, with separation caused by the engagement of surfaces 96 and 98. Alternatively, a separate biasing member (not shown) could be provided for lifting the upper housing off the lower housing once the control surfaces disengage from the mating swivel surface. The connection could also be designed so that pressure drop through the connection was sufficient to exert an axial force on the valve member provided in the lower housing such that, once the control surfaces no longer engage the mating pivoting surface, the pressure differential force would overcome gravity and lift the upper housing off the lower housing.

Additional modifications and alterations to the embodiments and methods described above should now be apparent to one skilled in the art from the foregoing description. Various modifications may thus be made in accordance with the teachings of the present invention, and the invention is thus not restricted to the preferred embodiments discussed herein and shown in the accompanying drawings. The scope of the invention should thus be understood and include all embodiments within the following claims.

What is claimed:

1. A separable connection for normally interconnecting first and second flow lines of a flow system and for selectively separating the first and second flow lines, the separable connection comprising:

a socket housing having a first end for sealed engagement with the first flow line, and opposing ball mating end opposite the first end, and a first flow path therein extending between the first end and the ball mating end;

a ball housing having a second end for sealed engagement with the second flow line, an opposing socket mating end opposite the second end, and a second flow path therein extending between the second end and the socket mating end;

one or more socket swivel surfaces each adjacent the ball mating end and radially fixed on the socket housing;

one or more ball swivel surfaces each adjacent the socket mating end for engagement with the one or more socket swivel surfaces and radially fixed on the ball housing;

a seal for maintaining sealing engagement between the ball housing and the socket housing to transmit fluid between the first and second flow paths when the ball housing pivots with respect to the socket housing; and one of the socket swivel surfaces and the ball swivel surfaces comprising at least three circumferentially arranged control surfaces each spaced between recessions within the respective housing and defining arcuate disengaging gaps each positioned circumferentially between respective control surfaces, such that the ball housing and the socket housing separate when the ball housing pivots with respect to the socket housing to cause one or more of the at least three control surfaces to disengage the other of the swivel surfaces.

2. The separable connection as defined in claim 1, further comprising:

each socket swivel surface lying within a surface portion of an imaginary socket sphere having its center spaced between the one or more socket swivel surfaces and the first end of the socket housing; and each ball swivel surface lying within a surface portion of an imaginary ball sphere having its center spaced opposite the second end with respect to the one or more ball swivel surfaces, the ball sphere having a diameter substantially equal to the socket sphere diameter, and the ball sphere center and the socket sphere center being substantially coincident when the ball housing and socket housing are mated, such that the one or more ball swivel surfaces remain in planar engagement with the one or more socket swivel surfaces when the ball housing pivots with respect to the socket housing.

3. The separable connection as defined in claim 2, wherein the seal comprises:

a connection seating surface on one of the ball housing and socket housing, the connection sealing surface defining an annular surface portion of an imaginary connection seating sphere having a diameter less than the ball sphere and the socket sphere, the connection seating sphere having its center substantially coincident with the center of the ball and socket spheres when the ball housing and the socket housing are mated;

an annular sealing member carried on the other of the ball housing and socket housing for sealing engagement with the connection seating surface as the ball housing pivots with respect to the socket housing.

4. The separable connection as defined in claim 3, further comprising:

the ball housing includes the at least three control surfaces, the control surfaces being outer surfaces on the ball housing substantially equally spaced about a spherical segment of the ball sphere; and each of the one or more socket swivel surfaces on the socket housing being a substantially annular surface.

5. The separable connection as defined in claim 4, further comprising:

the ball housing includes the connection seating surface; and the annular sealing member being an elastomeric sealing member carried on the socket housing for slidably engaging the connection seating surface on the ball housing.

6. The separable connection as defined in claim 3, further comprising:

the socket housing includes the at least three control surfaces, the control surfaces being internal surfaces on the socket housing substantially equally spaced about a spherical segment of the socket sphere; and each of the one or more ball swivel surfaces on the ball housing being a substantially annular surface.

7. The separable connection as defined in claim 1, wherein the socket housing comprises:

a socket sleeve having a central axis, and including the first end and the first flow path therein; and a collar axially movable relative to the socket sleeve for forcefully engaging the ball housing.

8. The separable connection as defined in claim 7, further comprising:

the socket sleeve having outer threads; and the collar having internal threads for threaded engagement with the socket sleeve to axially move the collar with respect to the socket sleeve.

9. The separable connection as defined in claim 1, further comprising:

a first valve member movably positioned within the first flow path within the socket housing and having a first end surface;

a second valve member movably positioned within the second flow path within the ball housing and having a second end surface for engagement with the first end surface when the ball housing is mated to the socket housing; and at least one of the ball housing and socket housing having a housing seating surface for sealing engagement with a respective valve member when the ball housing separates from the socket housing.

10. The separable connection as defined in claim 9, further comprising:

at least one of the ball housing and socket housing having a curvalinear guiding surface for slidably engaging the end surface of the valve member within the other of the ball housing and socket housing when the ball housing is mated to the socket housing.

11. The separable connection as defined in claim 1, further comprising:

one of the first and second flow lines having a flexible line portion; and a rigid elongate member secured at one end to one of the ball housing and socket housing, and secured in its opposing end to the flexible line portion, such that movement of the flexible line portion in a direction normal to the rigid elongate member transmits a force through the rigid elongate member to pivot the ball housing with respect to the socket housing.

12. A separable flow system for normally interconnecting fluid lines and for selectively separating the fluid lines, the system comprising:

a first rigidly mounted flow line;

a second flexible flow line movable relative to the first flow line;

a socket housing having a central axis, the socket housing including a sleeve having a first end for sealed engagement with one of the first and second flow lines, a collar having a ball mating end opposite the first end, and the socket housing having a first flow path therein extending between the first end and the ball mating end;

a ball housing having a central axis, a second end for sealed engagement with the other of the first and second flow lines, a socket mating end opposite the second end, and a second flow path therein extending between the second end and the socket mating end;

one or more socket swivel surfaces on the socket housing each adjacent the ball mating end and radially fixed on the socket housing, each socket swivel surface lying within a surface portion of an imaginary socket sphere having its center spaced between the one or more socket swivel surfaces and the first end of the socket housing;

one or more ball swivel surfaces each adjacent the socket mating end for engagement with the one or more socket swivel surfaces and radially fixed on the ball housing, each ball swivel surface lying within a surface portion of an imaginary ball sphere having its center spaced opposite the second end with respect to the one or more ball swivel surfaces, the ball sphere having a diameter substantially equal to the socket sphere diameter, and the ball sphere center and the socket sphere center being substantially coincident when the ball housing and socket housing are mated, such that the one or more ball swivel surfaces remain in planar engagement with the one or more socket swivel surfaces when the ball housing pivots with respect to the socket housing;

a connection seating surface on one of the ball housing and socket housing, the connection seating surface defining an annular surface portion of an imaginary connection seating sphere having a diameter less than the ball sphere and the socket sphere, the connection seating sphere having its center substantially coincident with the center of the ball and socket spheres when the ball housing and the socket housing are mated;

an annular sealing member carried on the other of the ball housing and socket housing for sealing engagement with the connection seating surface as the ball housing pivots with respect to the socket housing; and one of the socket swivel surfaces and the ball swivel surfaces comprising at least three circumferentially arranged control surfaces each spaced between arcuate disengaging gaps, such that the ball housing and the socket housing separate when the ball housing pivots with respect to the socket housing to cause one or more of the at least three control surfaces to disengage the other of the mating swivel surfaces.

13. A separable flow system as defined in claim 12, further comprising:
the sleeve including outer threads; and
the collar including inner threads for threaded engagement with the sleeve to axially move the collar relative to the sleeve.

14. The separable flow line system as defined in claim 12, further comprising:
the ball housing includes the at least three control surfaces, the control surfaces being outer surfaces on the ball housing substantially equally spaced about the a spherical segment of the ball sphere; and
each of the one or more socket swivel surfaces on the socket housing being an annular surface.

15. The separable flow system as defined in claim 12, further comprising:
a first valve member movably positioned within the first flow path within the socket housing and having a first end surface;
a second valve member movably positioned within the second flow path within the ball housing and having a second end surface for engagement with the first end surface when the ball housing is mated to the socket housing; and
at least one of the ball housing and socket housing having a housing seating surface for sealing engagement with a respective valve member when the ball housing separates from the socket housing.

16. The separable flow system as defined in claim 15, further comprising:
at least one of the ball housing and socket housing having a curvalinear guiding surface for slidably engaging the end surface of the valve member within the other of the ball housing and socket housing when the ball housing is mated to the socket housing.

17. A method of forming a separable connection between a first rigidly mounted flow line and second flexible flow line movable relative to the first flow line, the method comprising:
providing a socket housing having a first flow path and a ball housing having a second flow path;
sealingly fixing a terminal end of one of the socket housing and the ball housing to the first flow line;
sealingly securing a terminal end of the other of the socket housing and ball housing to the second flow line;
supporting an opposing end of the secured housing from an opposing end of the fixed housing while permitting the secured housing to pivot with respect to the fixed housing during movement of the flexible flow line;
maintaining sealed engagement between the fixed housing and the secured housing while the secured housing pivots within a selected arc limit with respect to the fixed housing; and
automatically releasing the secured housing from the fixed housing when pivoting of the secured housing exceeds the selected arc limit in response to movement of the flexible flow line, such that the secured housing becomes unsupported by and separates from the fixed housing.

18. The method as defined in claim 17, further comprising:
adjusting a mating force between the fixed housing and the secured housing to selectively control pivoting movement of the secured housing with respect to the fixed housing in response to movement of the flexible flow line.

19. The method as defined in claim 17, further comprising:
selecting a length of an elongate rigid member to control pivoting movement of the secured housing with respect to the fixed housing in response to movement of the flexible flow line;
securing one end of the elongate rigid member to the secured housing; and
securing an opposing end of the elongate rigid member to the flexible flow line.

20. The method as defined in claim 17, further comprising:
mounting a first valve member movable within the first flow path within the socket housing;
mounting a second valve member movable within the second flow path within the ball housing;
providing a seating surface on at least one of the socket housing and ball housing for sealing engagement with the respective valve member;
engaging the first valve member and the second valve member when mating the fixed housing to the secured housing to separate the respective valve member from its respective seating surface, thereby permitting flow through the connection when the housings are mated and terminating flow through the at least one housing when the housings are separated.

* * * * *